United States Patent

Beauprez

[11] Patent Number: 5,085,004
[45] Date of Patent: Feb. 4, 1992

[54] WINDOW LIFT MECHANISM

[75] Inventor: Gregory M. Beauprez, Toledo, Ohio

[73] Assignee: United Technologies Motor Systems, Inc., Columbus, Miss.

[21] Appl. No.: 546,074

[22] Filed: Jun. 29, 1990

Related U.S. Application Data

[63] Continuation-in-part of Ser. No. 484,029, Feb. 22, 1990, abandoned.

[51] Int. Cl.⁵ .............................................. E05F 15/00
[52] U.S. Cl. ......................................... 49/138; 49/349; 49/350; 49/363
[58] Field of Search ............... 49/350, 351, 349, 363, 49/138, 502

[56] References Cited

U.S. PATENT DOCUMENTS

| | | | |
|---|---|---|---|
| 2,145,659 | 1/1939 | Lane | 49/350 X |
| 2,658,790 | 11/1953 | Fish et al. | 49/350 |
| 2,707,320 | 5/1955 | Fish | 49/502 X |
| 2,791,464 | 5/1957 | Renno | 49/350 X |
| 2,817,512 | 12/1957 | Christen | 49/349 X |
| 2,905,003 | 9/1959 | Meyer et al. | 49/349 X |
| 3,344,554 | 10/1967 | Misaka et al. | 49/138 X |
| 3,670,454 | 6/1972 | Gebhard et al. | 49/349 X |
| 3,715,931 | 2/1973 | Littmann | 49/350 X |
| 3,724,133 | 4/1973 | Shirai et al. | 49/349 |
| 3,782,036 | 1/1974 | Clark et al. | 49/502 |
| 4,051,632 | 10/1977 | Fukumoto et al. | 49/348 |
| 4,648,208 | 3/1987 | Baldamus et al. | 49/502 |
| 4,998,379 | 3/1991 | Yamada et al. | 49/351 X |

FOREIGN PATENT DOCUMENTS

| | | | |
|---|---|---|---|
| 576171 | 5/1959 | Canada | 49/138 |
| 86119 | 8/1983 | European Pat. Off. | |
| 255417 | 2/1988 | European Pat. Off. | |
| 3744269 | 7/1989 | Fed. Rep. of Germany | |
| 34517 | 4/1981 | Japan | 49/350 |

Primary Examiner—Philip C. Kannan
Attorney, Agent, or Firm—Ronald G. Cummings

[57] ABSTRACT

An automobile window lift mechanism having a lift arm assembly for raising and lowering a window along a travel path between an open and closed position, a pinion gear for supplying rotative force from a motor or manual handle for actuating the lift arm assembly, and a gear train interconnecting the pinion gear and the lift arm assembly to provide a substantially instantaneous increase in mechanical advantage and window closing force as the window engages an upper seal in the closed position. The gear train includes a gear reduction configuration and/or an increased lever effort arm to increase the mechanical advantage only during the closing movement of the window as it engages the upper seal.

57 Claims, 3 Drawing Sheets

WINDOW LIFT MECHANISM

CROSS-REFERENCE TO RELATED APPLICATION

This application is a continuing application to U.S. Ser. No. 07/484,029 filed Feb. 22, 1990, now abandoned.

BACKGROUND AND SUMMARY OF THE INVENTION

This invention relates to automobile windows and more particularly to a window regulator or lift mechanism for raising and lowering automobile windows.

In conventional automobile window assemblies of the type where the window is actuated vertically, a seal extends along the upper portion of the window opening and the window seats against this seal in the closed position. Some recent window seal configurations require a significant closing force for the window to properly seat against the seal to form the desired tight-seal engagement.

In electric window assemblies, a greater lifting force can be achieved with a higher capacity motor. However, it is somewhat inefficient and disadvantageous to utilize a larger motor with a higher torque in order to attain a greater window closing force First, a larger motor increases the cost of the assembly Secondly, a larger motor may result in excessive wear. A higher lifting torque is required only over a small section of the window travel path, i.e., from the point where the window initially engages the upper seal to the fully closed position. Therefore, a higher lifting torque during the remainder of the window travel path is unnecessary and can produce unnecessary additional stress and wear on the window lift assembly. Furthermore, there are also potential hazards in using a high lifting torque prior to the very end of the window travel path. In electric windows, there is a danger of injury from being caught in the window especially with respect to small children. For safety considerations, it is desirable that any increased lifting torque be effective only when the window is sufficiently closed so as to inhibit or prevent an accidental catching In manual window assemblies, there are related considerations of convenience and speed in achieving a greater window closing force. The force required to properly engage the window seal may be troublesome to some people without assistance of an increased mechanical advantage. However, the tradeoff for an increased mechanical advantage is generally speed so that manual window operation may be inconvenient if a higher lifting torque is utilized over a significant portion of the travel path of the window.

Therefore, in both electric and manual window assemblies, it is desirable to achieve a high window closing force only during the latter part of the closing movement of the window as the window engages and seats against the upper window seal. Other applications may benefit from a change in mechanical advantage at other points along the window travel path.

Accordingly, it is an object of the present invention to provide a new and improved window lift mechanism for varying mechanical advantage over predetermined sections of the window travel path.

Another object of the invention is to provide such a window lift mechanism which achieves an increased closing force for the proper engagement of window and seal.

Another object of the invention is to provide such a window lift mechanism which achieves an increased closing force only during the latter part of the window travel path.

A further object of the invention is to provide such a window lift mechanism wherein the transition to an increased closing force is virtually instantaneous, smooth, and quiet.

A further object of the invention is to provide such a window lift mechanism which is suitable for electric and manual drive.

A still further object of the invention is to provide such a window lift mechanism which is cost efficient, adaptable to wide variety of window configurations, and safe, convenient, and durable in operation.

Other objects will be in part obvious and in part pointed out more in detail hereinafter.

Accordingly, it has been found that the foregoing and related objects and advantages are attained in an automobile window lift mechanism having a lift arm assembly, a pinion gear for actuating the lift arm assembly and a gear train interconnecting the pinion gear and the lift arm assembly. The lift arm assembly is configured for raising and lowering a window along a path of travel between an open position and a closed position where the window is in sealing engagement with an upper window seal. The window travel path comprises a first larger section extending between the open position and a predetermined position where the window is adjacent the upper seal and a second smaller section extending between the predetermined position and a closed position where the window is in seal-tight engagement with the upper window seal. The pinion gear supplies rotative force for actuating the lift arm assembly to raise and lower the window and the interconnecting gear train is configured to provide a first mechanical advantage over the first section of the window travel path and a greater second mechanical advantage over the second section of the travel path. The greater second mechanical advantage produces an increased closing force so the window properly seats against the seal.

In one embodiment, the interconnecting gear train includes a gear reduction configuration which provides an increased mechanical advantage only over the second section of the window travel path. In another embodiment, the gear train includes a larger effort arm between the pinion gear and the lift arm assembly for a greater mechanical advantage only during the second section of the window travel path. Other embodiments comprise a gear train which includes the combination of gear reduction and a larger effort arm for achieving a higher lifting torque only during the latter part of the window travel path.

BRIEF DESCRIPTION OF THE DRAWINGS

FIG. 2A is a partly broken away view of the pinion gear and gear train of FIG. 2.

DESCRIPTION OF THE PREFERRED EMBODIMENT

Figure 1:
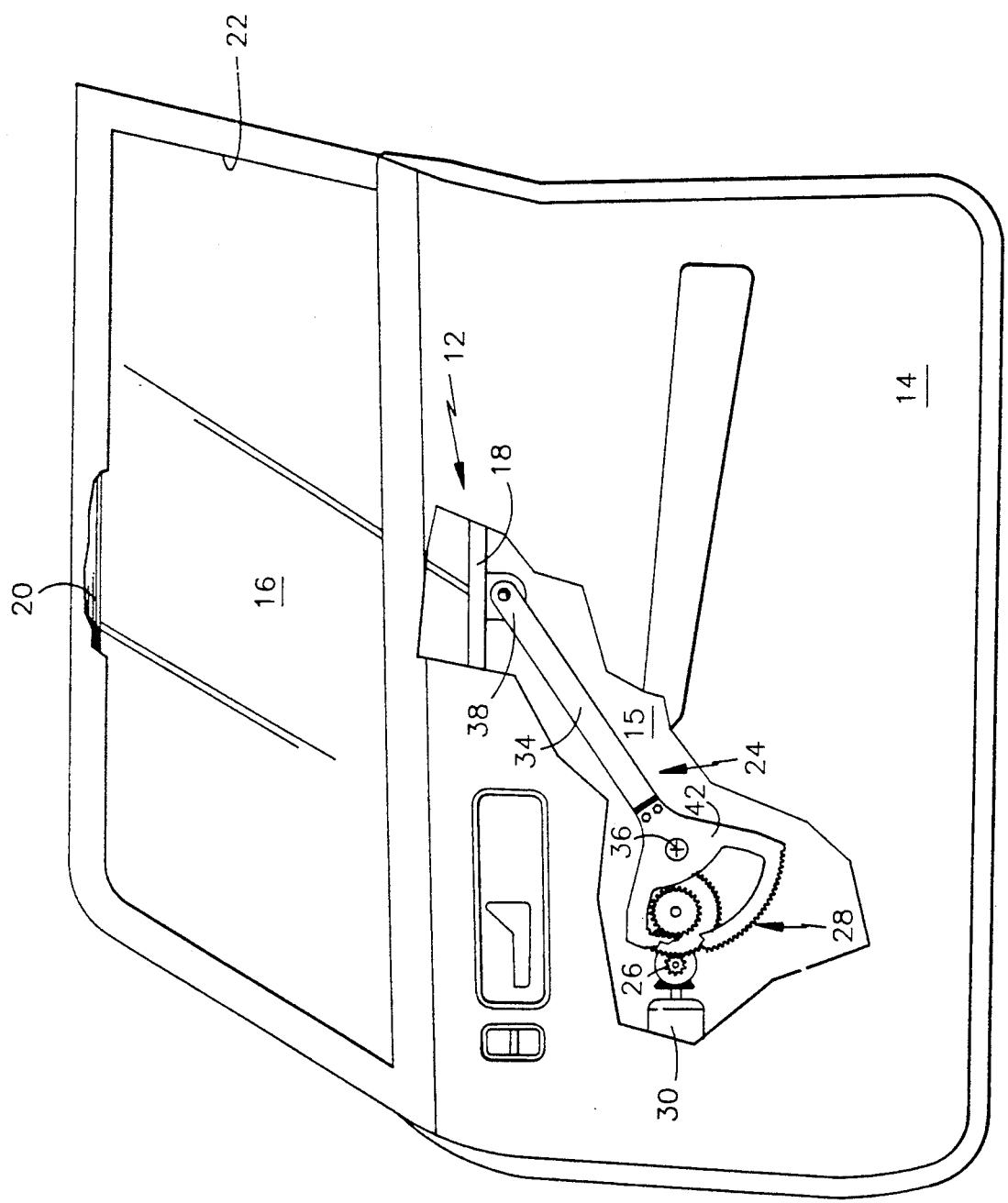
FIG. 1 is a side view, partly broken away, of a conventional automobile door and window assembly with the window lift mechanism of the present invention.

Although specific forms of the present invention have been selected for illustration in the drawings, and the following description is drawn in specific terms for the purpose of describing these forms of the invention, the description is not intended to limit the scope of the invention which is defined in the appended claims.

Referring to the drawings wherein like reference numerals refer to the same or like parts in the several embodiments, a conventional automobile door window assembly 12 is shown in FIG. 1 mounted in door 14. The window assembly 12 includes a window 16 with a lower edge mounted to a support bracket 18 and an upper edge adapted to engage an upper window seal 20. Side rails (not shown) guide the window 16 for movement vertically between an open position wherein it is withdrawn within the door cavity 15 and a closed position wherein it extends vertically into a tight-seal engagement with the upper seal 20 to close off the window opening 22. The window assembly is conventional and need not be described in further detail for purposes of the present invention.

The window lift mechanism of the present invention generally comprises a lift arm assembly designated by the numeral 24, a pinion gear 26 and a gear train assembly designated by the numeral 28 for interconnecting the lift arm assembly 24 and the pinion gear 26.

The pinion gear 26 supplies rotational force via gear train assembly 28 for actuating the lift arm assembly 24 to raise and lower the window 16. In the illustrated embodiment, the pinion gear is driven by an electric motor 30 in a conventional manner. Alternately, the pinion 26 may be driven manually by means of a handle.

The lift arm assembly 24 includes a lift arm or lever 34 pivotally mounted to the door 14 for rotation about a pivot axis 36. The lift arm 34 is pivotally connected at one end 38 to the window support bracket 18 and connected at the other end to the sector gear 42 of the gear train assembly 28. The pinion gear 26 via the gear train 28 pivots the lift arm 34 about the pivot axis 36 to raise and lower the window 16. The path of travel of the window between the open position and the closed position is diagrammatically represented in FIG. 2 relative to the corresponding angular position of the lift arm 34 as the window travels vertically between the open and closed positions. For purposes of explanation, the window travel path is divided into a first path section extending between the open position and a predetermined position and a second path section extending between the predetermined position and the closed position. In the illustrated embodiment, the predetermined position represents a window position wherein the window is immediately adjacent the window seal 20 so that an increased closing force is required thereafter to properly seal the window against the upper seal. As can be seen, the first travel path section is considerably larger than the second travel path section.

Figure 2:
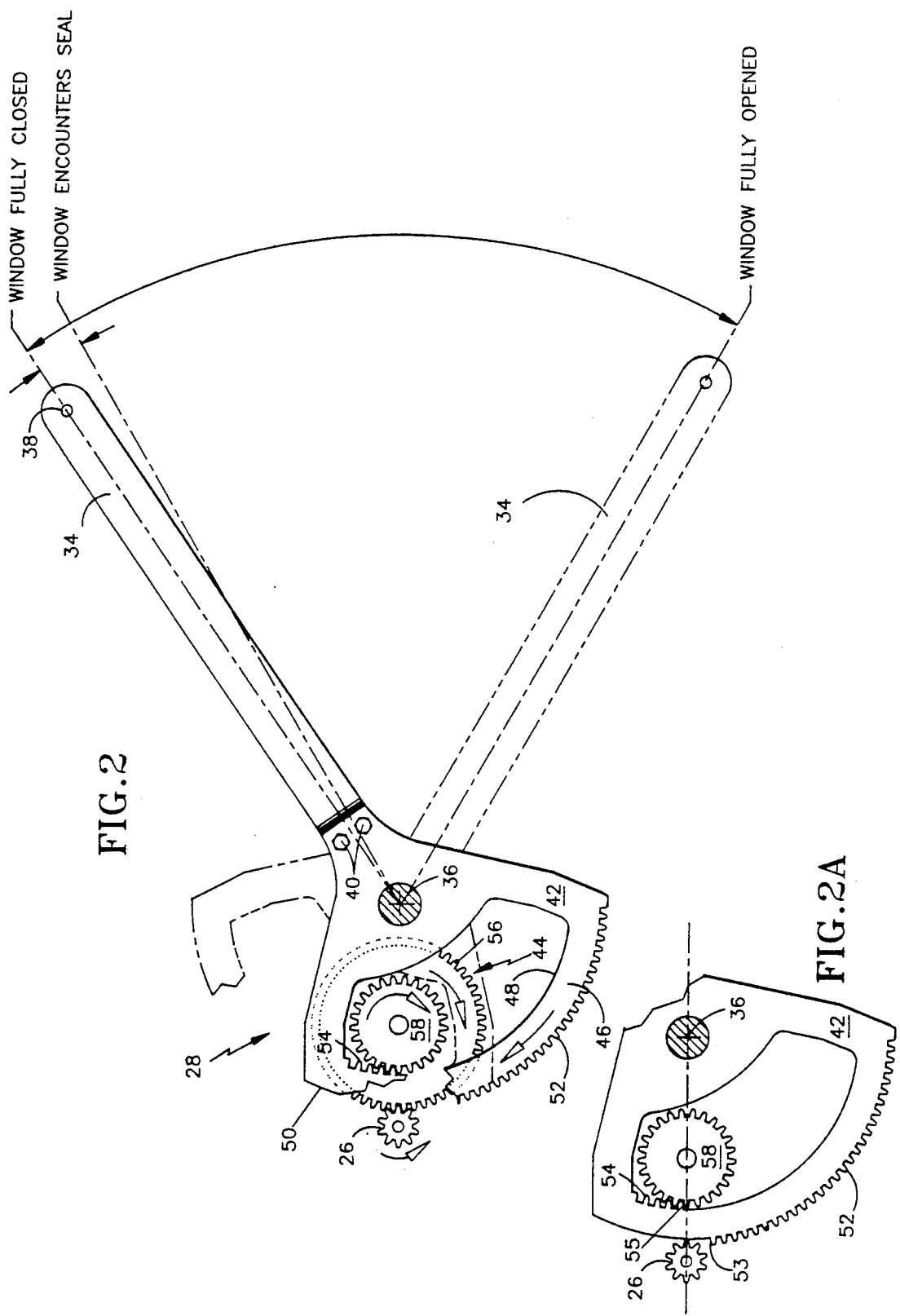
FIG. 2 is a partly broken away diagrammatic view depicting the movement of the window lift mechanism of FIG. 1 between the window closed position and the window open position.

Referring to FIG. 2, the gear train assembly 28 comprises a sector gear 42 and a dual reduction gear 44. The sector gear 42 is connected to the end portion of lift arm 34 by bolts 40 or the like and is mounted for pivotal movement about the common pivot axis 36. The rotation of the sector gear 42 pivots the lift arm 34 to raise or lower the window accordingly.

The sector gear 42 is configured to be driven by either the pinion gear 26 directly or by the reduction gear 44. The sector gear 42 has an arcuate portion 46 with a radially inwardly facing surface 48 and an opposite outwardly facing surface 50. The outer surface 50 has a discrete gear section 52 and the inner surface 48 has a discrete gear section 54. The outer gear section 52 is configured for engagement with the pinion gear 26 and the inner gear section 54 is configured for engagement with the reduction gear 44.

The reduction gear 44 is rotatably mounted between the pinion gear 26 and the pivot axis 36. The reduction gear 44 is of dual-gear configuration having an outer gear 56 and a concentric inner gear 58. The outer gear 56 is configured to engage the pinion gear 26 and the inner gear 58 is configured to engage the inner gear section 54 of sector gear 42. The outer gear 56 is always in engagement with the pinion gear 26 while, as explained in detail hereinafter, the inner gear 58 engages inner gear section 54 of the sector gear only during the second section of the window travel path.

The pinion gear 26 directly engages the sector gear 42 to actuate the window over the first section of travel path and then drives the sector gear through reduction gear 44 to actuate the window over the second section of travel path. Referring to FIG. 2A, the gear sections 52, 54 of sector gear 42 are precisely positioned relative to each other and to gears 26, 58, respectively, to operate as follows. Gear section 52 is engaged by pinion gear 26 to rotate the lift arm 34 only through the first section of the travel path of the window. The end 53 of gear section 52 is precisely positioned relative to the end 55 of gear section 54 such that gear 58 engages gear section 54 substantially precisely when pinion gear 26 disengages gear section 52. Since reduction gear 58 is integrally connected to gear 56 which is being driven by pinion gear 26, the reduction gear 58 is driving the sector gear 42 and thus the lift arm 34. The shift to reduction gear 58 as the driving gear for sector gear 42 is both smooth and quiet. The reduction gear 58 engages the gear section 54 of sector gear 42 to rotate the lift arm 34 only through the second section of the window travel path, i.e., between the predetermined position and the closed position. Notably, the pinion gear 26 cannot engage the gear section 52 contemporaneous with the reduction gear 58 engaging the gear section 54.

The dual reduction gear 44 is configured to provide a significantly greater mechanical advantage for rotating the lift arm 34 through the second section of travel path as compared to the mechanical advantage from pinion gear 26 directly driving the sector gear 42 to rotate the lift arm 34 through the first section of travel path. The increase in mechanical advantage is substantially determined by the relative size of the reduction gear which is accordingly dimensioned to provide a sufficient window closing force to insure a tight-seal engagement between the window and the upper seal.

In operation, for a constant torque at pinion gear 26 as produced by motor 30, the lift arm 34 will experience a substantially instantaneous increase in torque at the predetermined position as the window travels to the closed position. Accordingly, the lifting force applied to window 16 is significantly less during the first travel path section and greatly increases for the second travel path section to achieve a proper engagement with the upper seal 20.

While the illustrated embodiment is configured to provide a substantially instantaneous change in lifting force at a window position immediately adjoining the window seal 20, this predetermined position may be varied to another point on the window travel path depending upon the particular application. Accordingly, the predetermined position for the change in lifting force may be adjusted by appropriately changing the relative positions of the discrete gear sections of the sector gear and the pinion and intermediate gears. Alternately, eccentric gear configurations may be utilized to progressively vary the mechanical advantage over the travel path as, for example, to gradually increase or decrease the mechanical advantage.

Figure 3:
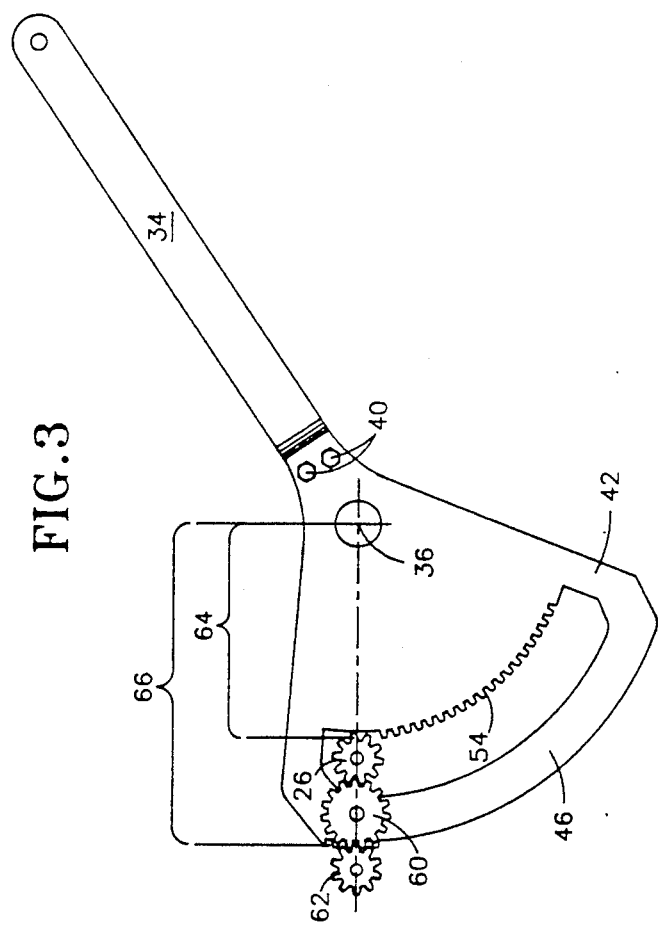
FIG. 3 is a view similar to FIG. 2 of an alternate embodiment.

Referring to FIG. 3, an alternate embodiment of the window lift mechanism is shown wherein an increased mechanical advantage is attained by increasing the effort arm of the lever 34 as opposed to a gear reduction as in the case of the embodiment of FIG. 2. In the embodiment of FIG. 3, the gear train assembly 28 comprises a sector gear 42, an idler gear 60 and a secondary pinion gear 62 of approximately the size of pinion gear 26. The sector gear 42 has discrete radially-spaced gear sections 52, 54. The gear sections 52, 54 face radially outward with gear section 54 being the innermost gear section. The gear section 54 is configured to engage pinion 26 to rotate the lift arm 34 only through the first section of the window travel path from the open position to the predetermined position. The pinion gear 26 is interconnected to secondary pinion gear 62 by idler gear 60. Gear section 52 is configured to engage secondary pinion gear 62 to pivot the lift arm 34 only through the second section of the window travel path from the predetermined position to the closed position. Similar to the embodiment of FIG. 2, the arcuate gear sections 52, 54 are precisely positioned so that secondary pinion 62 engages gear section 52 only upon disengagement of the primary pinion gear 26 from gear section 54.

The sector gear 42 functions as the effort arm of a mechanical lever in rotating the lift arm 34 between the open and closed window positions. The radial distance between the pivot axis 36 and the gear section 54 defines an effort arm 64 when the pinion gear 26 is directly driving the sector gear 42. The radial distance between pivot axis 36 and gear section 52 defines a second effort arm 66 when the sector gear 42 is being driven by the secondary pinion gear 62. The larger effort arm 66 provides a greater mechanical advantage than the smaller effort arm 64. Accordingly, the effort arms 64, 66 are dimensioned to provide the desired window lifting forces during each section of the window travel path.

As can be seen, the embodiment of FIG. 3 achieves the necessary increased mechanical advantage for the closing section of the window travel path by appropriately increasing the effective effort arm while the embodiment of FIG. 2 achieves a similar result by gear reduction. Dimensionally, the embodiment of FIG. 3 requires more longitudinal mounting space in the automobile door cavity while the embodiment of FIG. 2 requires more transverse mounting space.

Figure 4:
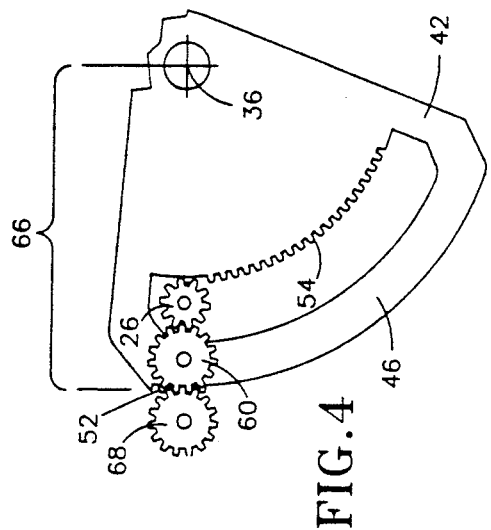
FIG. 4 is a partly broken away view similar to FIG. 3 of another alternate embodiment.

Referring to FIG. 4, another alternate embodiment is shown which achieves the desired increase in mechanical advantage by gear reduction in combination with a larger effort arm during the second section of the window travel path. In the embodiment of FIG. 4, a reduction gear 68 is utilized in place of the secondary pinion gear 62 to produce a mechanical advantage by gear reduction over the second section of the window travel path. The mechanical advantage achieved by the gear reduction is then increased by the mechanical advantage achieved by the larger effort arm 66.

In operation, the pinion gear 26 engages gear section 54 to drive the sector gear 42 over the first section of window travel. At the predetermined window position adjacent to window seal, pinion gear 26 disengages gear section 54 while reduction gear 68 engages gear section 52 to function as a secondary pinion gear driving sector gear 42 over the second section of window travel path. An increase lifting force is attained over the second section of window travel path by virtue of the greater mechanical advantage obtained from the gear reduction and the extended effort arm.

Figure 5:
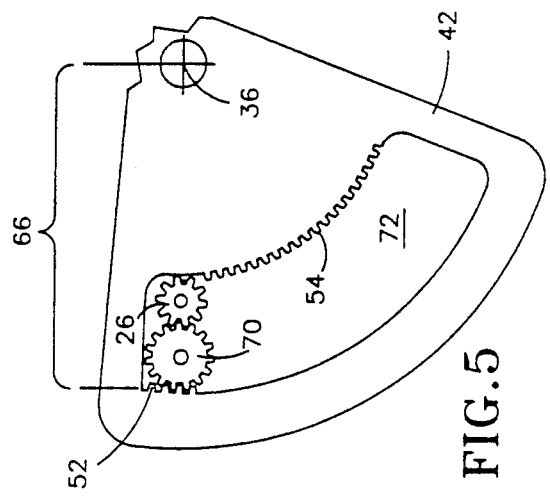
FIG. 5 is a view similar to FIG. 4 of another alternate embodiment.
Figure 3A:
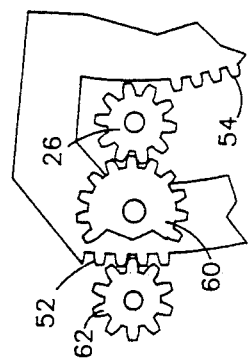
FIG. 3A is an enlarged broken away view of the pinion gear and gear train of FIG. 3.

Referring to FIG. 5, another alternate embodiment is shown which also utilizes a combination of gear reduction and a greater effort arm to achieve the necessary increased mechanical advantage over the second section of the window travel path. In this configuration, the discrete gear sections 52, 54 are disposed on opposing arcuate walls of a radial slot 72 in the sector gear 42 with the gear section 52 on the outer slot wall facing radially inward and the gear section 54 on the inner slot wall facing radially outward.

The gear section 54 is configured and disposed to engage the pinion gear 26 during the first section of window travel path as previously described. The pinion gear 26 is always in engagement with the reduction gear 70. The gear section 52 is configured and disposed to engage the reduction gear 70 only upon disengagement of gear section 54 from the pinion gear 26 so that the reduction gear 70 drives the sector gear 42 only over the second section of window travel path. The engagement of reduction gear 70 and discrete gear section 52 forms a larger effort arm 66 acting on lever 34 as compared to the engagement of pinion 26 with gear section 54. Consequently, a greater mechanical advantage is obtained by the combination of the mechanical advantage achieved by reduction gear 70 and the mechanical advantage achieved by the greater effort arm 66. Notably, the embodiment of FIG. 5 utilizes less gears than the embodiments of FIGS. 2-4.

In the several embodiments, the relative dimensions of the reduction gear and/or the effort arms are preselected to conform to the particular window assembly and the window closing force required to insure a proper seating of the window to the upper window seal. For other applications, the various embodiments may be adapted to provide a change in mechanical advantage over any discrete portion(s) of the window travel path as, for example, to provide a greater mechanical advantage during only a middle portion of the travel path.

While the illustrated embodiments utilize a lift arm assembly having a single arm, it is to be understood that the present invention is operable with dual-arm and other similar lift assembly configurations. Drive configurations other than a gear drive and gear train may also be utilized to vary mechanical advantage such as friction drive configurations, belt drives, etc.

As can be seen, a window lift mechanism has been described which is suitable for both electric and manually driven window assemblies and which provides an increased closing force only during the latter part of the closing movement of the window for achieving a proper window seal. Moreover, the increased closing force is attained in a smooth, quiet and safe manner.

As will be apparent to persons skilled in the art, various modifications and adaptations of the structure above described will become readily apparent without departure from the spirit and scope of the invention, the scope of which is defined in the appended claims.

What is claimed is:

1. An automobile window lift assembly for an automobile window which sealingly engages an upper window seal in a closed position comprising lift arm means for raising and lowering a window along a path of travel between an open position and a closed position in sealing engagement with an upper window seal, the window travel path comprising at least first and second sections, means for supplying rotative force for actuating the lift arm means to raise and lower a window, and means interconnected to the rotative force means and the lift arm means for providing a first substantially constant mechanical advantage over said first section of the travel path and a second substantially constant mechanical advantage over said second section of the travel path, said second mechanical advantage being greater than said first mechanical advantage.

2. The assembly of claim 1 wherein said means for supplying rotative force comprises pinion gear means for supplying rotative force for actuating the lift arm means to raise and lower a window, and said means for providing a first mechanical advantage over said first section of the travel path and a second mechanical advantage over said second section of the travel path comprises gear train means interconnecting the pinion gear means and the lift arm means for providing said first mechanical advantage over said first section of the travel path and said second mechanical advantage over said second section of the travel path.

3. The assembly of claim 2 wherein said gear train means comprises gear reduction means for providing said second mechanical advantage.

4. The assembly of claim 2 wherein said lift arm means comprises a lever mounted for pivotal movement about a pivot axis to raise and lower a window, and said gear train means is connected to said lever to pivot said lever responsive to said pinion gear means so as to define a first effort arm for said first section of the travel path and a second effort arm for the second section of the travel path, said second effort arm being greater than said first effort arm so that the mechanical advantage for said second effort arm is greater than the mechanical advantage for said first effort arm.

5. The assembly of claim 1 wherein said means for supplying rotative force comprises pinion gear means for supplying rotative force for actuating the lift arm means to raise and lower a window, said and means for providing a first mechanical advantage over said first section of the travel path and a second mechanical advantage over said second section of the travel path comprises gear train means interconnecting the pinion gear means and the lift arm means for providing said first mechanical advantage over said first section of the travel path and said second mechanical advantage over said second section of the travel path, and said first section of the travel path extending between the open position and a predetermined position and said second section extending between said predetermined position and said closed position.

6. The assembly of claim 5 wherein said predetermined position is disposed relative to said closed position so that a window at said predetermined position is adjacent the upper window seal.

7. The assembly of claim 5 wherein said gear train means comprises gear reduction means for providing said second mechanical advantage.

8. The assembly of claim 5 wherein said lift arm means comprises a lever mounted for pivotal movement about a pivot axis to raise and lower a window, and said gear train means is connected to said lever to pivot said lever responsive to said pinion gear means so as to define a first effort arm for said first section of the travel path and a second effort arm for the second section of the travel path, said second effort arm being greater than said first effort arm so that the mechanical advantage for said second effort arm is greater than the mechanical advantage for said first effort arm.

9. The assembly of claim 5 wherein said pinion gear means is adapted for connection to a manual window handle.

10. The assembly of claim 5 wherein said pinion gear means is connected to a window lift motor.

11. The assembly of claim 5 wherein said second mechanical advantage is predetermined to provide a window lift force adapted for a tight-seal engagement between a window and a window seal.

12. The assembly of claim 11 wherein said pinion gear means is adapted for connection to a manual window handle.

13. The assembly of claim 11 wherein said pinion gear means is connected to a window lift motor.

14. An automobile window lift assembly for an automobile window which sealingly engages an upper window seal in a closed position comprising lift arm means for raising and lowering a window along a path of travel between an open position and a closed position in sealing engagement with an upper window seal, the window travel path comprising at least first and second sections, pinion gear means for supplying rotative force for actuating the lift arm means to raise and lower a window, and gear train means interconnecting the pinion gear means and the lift arm means for providing a first mechanical advantage over said first section of the travel path and a second mechanical advantage over said second section of the travel path, said second mechanical advantage being greater than said first mechanical advantage, said first section of the travel path extending between the open position and a predetermined position and said second section extending between said predetermined position and said closed position, said gear train means comprising a sector gear connected to said lift arm means for actuating said lift arm means responsive to rotative force to raise and lower a window, said sector gear having separate first and second gear sections with said pinion gear means engaging said first gear section only for said first section of the travel path, and intermediate gear means for interconnecting said pinion gear means and said second gear section of said sector gear only for said second section of the travel path.

15. The assembly of claim 14 wherein said pinion gear means, said intermediate gear means and said first and second gear sections of said sector gear are configured and disposed so that said intermediate gear means connects said pinion gear means to said second gear section substantially precisely upon disengagement of said pinion gear means from said first gear section as a window is raised from the first section of travel path to the second section of travel path and said pinion gear means engages said first gear section substantially precisely upon disconnection of said intermediate gear means from said second gear section as a window is lowered from the first section of travel path to the second section of travel path.

16. The assembly of claim 14 wherein said intermediate gear means comprises gear reduction means for providing a mechanical advantage between said pinion gear means and said sector gear.

17. The assembly of claim 14 wherein
said first and second gear sections are radially spaced with said first gear section being disposed radially inward from said second gear section, and
said intermediate gear means comprises a reduction gear for engaging said second gear section.

18. The assembly of claim 17 wherein said intermediate gear means comprises an idler gear between said pinion gear means and said reduction gear.

19. The assembly of claim 17 said first and second gear sections are radially spaced so as to provide a greater mechanical advantage when said pinion gear means is interconnected to said second gear section.

20. The assembly of claim 14 wherein
said first and second gear sections are radially spaced with said first gear section being disposed radially outward from said second gear section, and
said intermediate gear means comprises a reduction gear for engaging said second gear section.

21. The assembly of claim 14 wherein said first and second gear sections are radially spaced so as to provide a greater mechanical advantage when said pinion gear means is interconnected to said second gear section.

22. An automobile window lift assembly for an automobile window which sealingly engages an upper window seal in a closed position comprising
lift arm means for raising and lowering a window along a path of travel between an open position and a closed position in sealing engagement with an upper window seal, the window travel path comprising at least first and second sections,
pinion gear means for supplying rotative force for actuating the lift arm means to raise and lower a window, and
gear train means interconnecting the pinion gear means and the lift arm means for providing a first mechanical advantage over said first section of the travel path and a second mechanical advantage over said second section of the travel path, said second mechanical advantage being greater than said first mechanical advantage,
said lift arm means comprising a lever mounted for pivotal movement about a pivot axis to raise and lower a window, and
said gear train means comprising
a sector gear mounted to said lever for rotational movement about said pivot axis to pivot said lever,
said sector gear having first and second radially spaced arcuate gear sections with said pinion gear means engaging said first gear section only for said first section of the travel path, and
intermediate gear means for interconnecting said pinion gear means and said second gear section of said sector gear only for said second section of the travel path.

23. The assembly of claim 22 wherein said first gear section defines a first effort arm of said lever relative to said pivot axis and said second gear section defines a second effort arm of said lever relative to said pivot axis, said second effort arm being greater than said first effort arm.

24. The assembly of claim 23 wherein
said pinion gear means comprises a primary pinion gear for engaging said first gear section only for said first section of the travel path,
said intermediate gear means comprises a secondary pinion gear for engaging said second gear section only for said second section of the travel path and an idler gear interconnecting said primary pinion gear and said secondary pinion gear, and
said second effort arm is configured to substantially produce said second mechanical advantage.

25. The assembly of claim 24 wherein said first and second gear sections of said sector gear face radially outward.

26. The assembly of claim 23 wherein
said pinion gear means comprises a pinion gear for engaging said first gear section only for said first section of the travel path, and
said intermediate gear means comprises a reduction gear for engaging said second gear section only for said second section of the travel path and an idler gear interconnecting said pinion gear and said reduction gear.

27. The assembly of claim 26 wherein said first and second gear sections of said sector gear face radially outward.

28. The assembly of claim 23 wherein
said pinion gear means comprises a pinion gear for engaging said first gear section only for said first section of the travel path and
said intermediate gear means comprises a reduction gear for engaging said second gear section only for said second section of the travel path, said reduction gear directly engaging said pinion gear.

29. The assembly of claim 28 wherein said first gear section of said sector gear faces radially outward and said second gear section of said sector gear faces radially inward.

30. The assembly of claim 22 wherein
said first gear section defines a first effort arm of said lever relative to said pivot axis and said second gear section defines a second effort arm of said lever relative to said pivot axis, said first effort arm being greater than said second effort arm and
said pinion gear means comprises a pinion gear for engaging said first gear section only for said first section of the travel path.

31. The assembly of claim 30 wherein said first gear section of said second gear faces radially outward and said second gear section of said sector gear faces radially inward, and said intermediate gear means comprises a dual reduction gear having concentric inner and outer gear portions, said outer gear portion engaging said pinion gear and said inner gear portion engaging said second gear section only for said second section of the travel path.

32. An automobile window lift assembly for an automobile window which sealingly engages an upper window seal in a closed position comprising lift arm means for raising and lowering a window along a path of travel between an open position and a closed position in sealing engagement with an upper window seal, the window travel path comprising at least first and second sections, pinion gear means for supplying rotative force for actuating the lift arm means to raise and lower a window, and p1 gear train means interconnecting the pinion gear means and the lift arm means for providing a first mechanical advantage over said first section of the travel path and a second mechanical advantage over said second section of the travel path, said second mechanical advantage being greater than said first mechanical advantage, said gear train means comprising a sector gear connected to said lift arm means for actuating said lift arm means responsive to rotative force to raise and lower a window, said sector gear having separate first and second gear sections with said pinion gear means engaging said first gear section only for said first section of the travel path, and intermediate gear means for interconnecting said pinion gear means and said second gear section of said sector gear only for said second section of the travel path.

33. The assembly of claim 32 wherein said pinion gear means, said intermediate gear means and said first and second gear sections of said sector gear are configured and disposed so that said intermediate gear means connects said pinion gear means to said second gear section substantially precisely upon disengagement of said pinion gear means from said first gear section as a window is moved from the first section of travel path to the second section of travel path and said pinion gear means engages said first gear section substantially precisely upon disconnection of said intermediate gear means from said second gear section as a window is moved from the first section of travel path to the second section of travel path.

34. The assembly of claim 32 wherein said intermediate gear means comprises gear reduction means for providing a mechanic advantage between said pinion gear means and said sector gear.

35. The assembly of claim 32 wherein said first and second gear sections are radially spaced with said first gear section being disposed radially inward from said second gear section, and said intermediate gear means comprises a reduction gear for engaging said second gear section.

36. The assembly of claim 35 wherein said intermediate gear means comprises an idler gear between said pinion gear means and said reduction gear.

37. The assembly of claim 35 wherein said first and second gear sections are radially spaced so as to provide a greater mechanical advantage when said pinion gear means is interconnected to said second gear section.

38. The assembly of claim 32 wherein said first and second gear sections are radially spaced with said first gear section being disposed radially outward from said second gear section, and said intermediate gear means comprises a reduction gear for engaging said second gear section.

39. The assembly of claim 32 wherein said first and second gear sections are radially spaced so as to provide a greater mechanical advantage when said pinion gear means is interconnected to said second gear section.

40. An automobile window lift assembly for an automobile window which sealingly engages an upper window seal in a closed position comprising lift arm means for raising and lowering a window along a path of travel between an open position and a closed position in sealing engagement with an upper window seal, the window travel path comprising at least first and second sections, pinion gear means for supplying rotative force for actuating the lift arm means to raise and lower a window, and gear train means interconnecting the pinion gear means and the lift arm means for providing a first mechanical advantage over said first section of the travel path and a second mechanical advantage over said second section of the travel path, said second mechanical advantage being greater than said first mechanical advantage, said lift arm means comprising a lever mounted for pivotal movement about a pivot axis to raise and lower a window, and said gear train means comprising a sector gear mounted to said lever for rotational movement about said pivot axis to pivot said lever, said sector gear having first and second radially spaced arcuate gear sections with said pinion gear means engaging said first gear section only for said first section of the travel path, and intermediate gear means for interconnecting said pinion gear means and said second gear section of said sector gear only for said second section of the travel path.

41. The assembly of claim 40 wherein said first gear section defines a first effort arm of said lever relative to said pivot axis and said second gear section defines a second effort arm of said lever relative to said pivot axis, said second effort arm being greater than said first effort arm.

42. The assembly of claim 41 wherein said pinion gear means comprises a primary pinion gear for engaging said first gear section only for said first section of the travel path, said intermediate gear means comprises a secondary pinion gear for engaging said second gear section only for said second section of the travel path and an idler gear interconnecting said primary pinion gear and said secondary pinion gear, and said second effort arm is configured to substantially produce said second mechanical advantage.

43. The assembly of claim 42 wherein said first and second gear sections of said sector gear face radially outward.

44. The assembly of claim 41 wherein said pinion gear means comprises a pinion gear for engaging said first gear section only for said first section of the travel path, and said intermediate gear means comprises a reduction gear for engaging said second gear section only for said second section of the travel path and an idler gear interconnecting said pinion gear and said reduction gear.

45. The assembly of claim 44 wherein said first and second gear sections of said sector gear face radially outward.

46. The assembly of claim 41 wherein said pinion gear means comprises a pinion gear for engaging said first gear section only for said first section of the travel path and said intermediate gear means comprises a reduction gear for engaging said second gear section only for said second section of the travel path, said reduction gear directly engaging said pinion gear.

47. The assembly of claim 46 wherein said first gear section of said sector gear faces radially outward and said second gear section of said sector gear faces radially inward.

48. The assembly of claim 40 wherein said first gear section defines a first effort arm of said lever relative to said pivot axis and said second gear section defines a second effort arm of said lever relative to said pivot axis, said first effort arm being greater than said second effort arm and said pinion gear means comprises a pinion gear for engaging said first gear section only for said first section of the travel path.

49. The assembly of claim 48 wherein said first gear section of said second gear faces radially outward and said second gear section of said sector gear faces radially inward, and said intermediate gear means comprises a dual reduction gear having concentric inner and outer gear portions, said outer gear portion engaging said pinion gear and said inner gear portion engaging said second gear section only for said second section of the travel path.

50. An automobile window lift assembly for an automobile window which sealingly engages an upper window seal in a closed position comprising lift arm means for raising and lowering a window along a path of travel between an open position and a closed position in sealing engagement with an upper window seal, the window travel path comprising a first larger section and a second smaller section, said first section extending between the open position and a predetermined position where the window is adjacent the upper seal and said second section extending between said predetermined position and said closed position, pinion gear means for supplying rotative force for actuating the lift arm means to raise and lower a window, and gear train means interconnecting the pinion gear means and the lift arm means for providing a first mechanical advantage over said first section of the travel path and a second greater mechanical advantage over said second section of the travel path, said gear train means comprising a sector gear connected to said lift arm means for actuating said lift arm means responsive to rotative force to raise and lower a window, said sector gear having separate first and second discrete gear sections with said pinion gear means engaging said first gear section only for said first section of the travel path to provide said first mechanical advantage, and intermediate gear means for interconnecting said pinion gear means and said second gear section of said sector gear only for said second section of the travel path to provide said second mechanical advantage.

51. The assembly of claim 50 wherein said pinion gear means, said intermediate gear means and said first and second gear sections of said sector gear are configured and disposed so that said intermediate gear means connects said pinion gear means to said second gear section substantially precisely upon disengagement of said pinion gear means from said first gear section as a window is raised from the first section of travel path to the second section of travel path and said pinion gear means engages said first gear section substantially precisely upon disconnection of said intermediate gear means from said second gear section as a window is lowered from the first section of travel path to the second section of travel path.

52. The assembly of claim 51 wherein said intermediate gear means comprises gear reduction means for providing a mechanical advantage between said pinion gear means and said sector gear.

53. The assembly of claim 51 wherein said first and second gear sections are radially spaced with said first gear section being disposed radially inward from said second gear section, and said intermediate gear means comprises a reduction gear for engaging said second gear section.

54. The assembly of claim 53 wherein said intermediate gear means comprises an idler gear between said pinion gear means and said reduction gear.

55. The assembly of claim 53 wherein said first and second gear sections are radially spaced so as to provide a greater mechanical advantage when said pinion gear means is interconnected to said second gear section.

56. The assembly of claim 50 wherein said first and second gear sections are radially spaced with said first gear section being disposed radially outward from said second gear section, and said intermediate gear means comprises a reduction gear for engaging said second gear section.

57. The assembly of claim 50 wherein said first and second gear sections are radially spaced so as to provide a greater mechanical advantage when said pinion gear means is interconnected to said second gear section.

* * * * *

UNITED STATES PATENT AND TRADEMARK OFFICE
CERTIFICATE OF CORRECTION

PATENT NO.   : 5,085,004
DATED        : Feb. 4, 1992
INVENTOR(S)  : Gregory M. Beauprez It is certified that error appears in the above-identified patent and that said Letters Patent is hereby corrected as shown below:

Column 7, line 62:  delete "and".

Column 11, line 20:  delete "p1".

Signed and Sealed this

Fourteenth Day of September, 1993

Attest:

BRUCE LEHMAN

Attesting Officer                Commissioner of Patents and Trademarks